United States Patent [19]

Tokuyama

[11] Patent Number: 4,725,898
[45] Date of Patent: Feb. 16, 1988

[54] PSEUDO VERTICAL SYNCHRONIZING SIGNAL PRODUCING CIRCUIT

[75] Inventor: Yoshio Tokuyama, Yokohama, Japan

[73] Assignee: Victor Company of Japan, Ltd., Yokohama, Japan

[21] Appl. No.: 870,839

[22] Filed: Jun. 5, 1986

[51] Int. Cl.$^4$ .................. H04N 5/93; H04N 5/783
[52] U.S. Cl. ................................ 360/10.1; 360/37.1; 360/33.1; 358/335
[58] Field of Search ............... 360/10.1, 37.1, 10.3, 360/33.1; 358/150, 319, 335

[56] References Cited

U.S. PATENT DOCUMENTS

| Re. 31,078 | 11/1982 | Segerstrom | 360/37.1 |
| 3,197,559 | 7/1965 | Kihara | 360/37.1 |
| 4,293,879 | 10/1981 | Heitmann | 360/37.1 |
| 4,509,082 | 4/1985 | Kroner | 360/37.1 |

FOREIGN PATENT DOCUMENTS

| 0041868 | 6/1981 | European Pat. Off. . |
| 0102809 | 8/1983 | European Pat. Off. . |
| 2207039 | 2/1972 | Fed. Rep. of Germany . |
| 2914024 | 4/1979 | Fed. Rep. of Germany . |
| 3232886 | 9/1982 | Fed. Rep. of Germany . |

Primary Examiner—Alan Faber
Attorney, Agent, or Firm—Michael N. Meller

[57] ABSTRACT

A pseudo vertical synchronizing signal producing circuit produces a pseudo vertical synchronizing signal which is used instead of a regular vertical synchronizing signal of a video signal during a special reproduction mode of a helical scan type magnetic recording and/or reproducing apparatus. The pseudo vertical synchronizing signal producing circuit effectively utilizes a counter circuit for producing a pulse when a counted value therein reaches predetermined threshold values set therein, and employs a minimum number of monostable multivibrators and external variable resistors coupled thereto, so that the circuit can easily be manufactured in the form of an integrated circuit.

14 Claims, 23 Drawing Figures

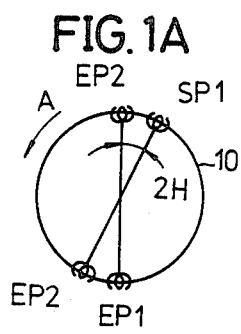
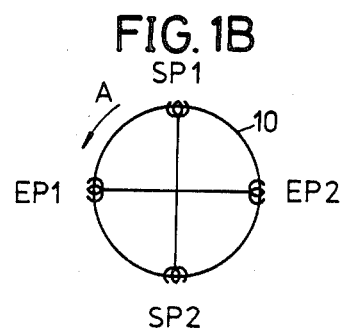
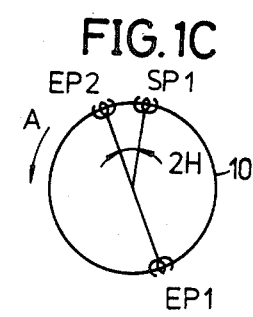
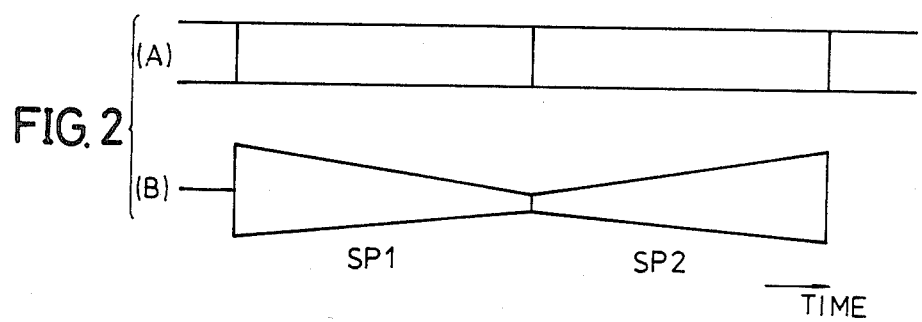
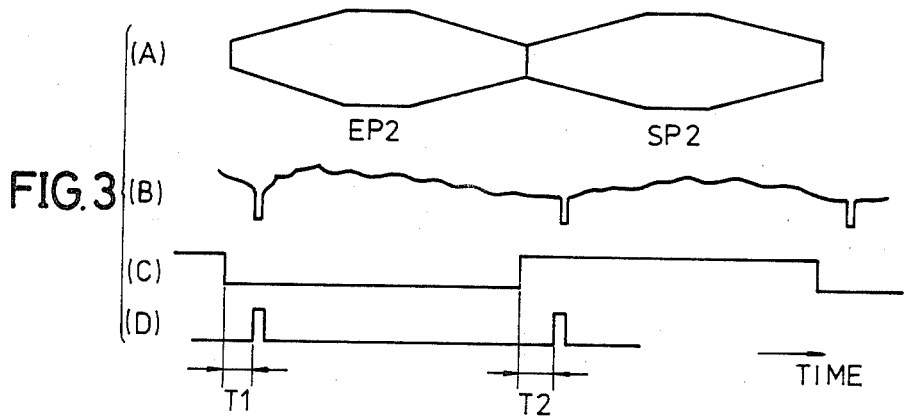

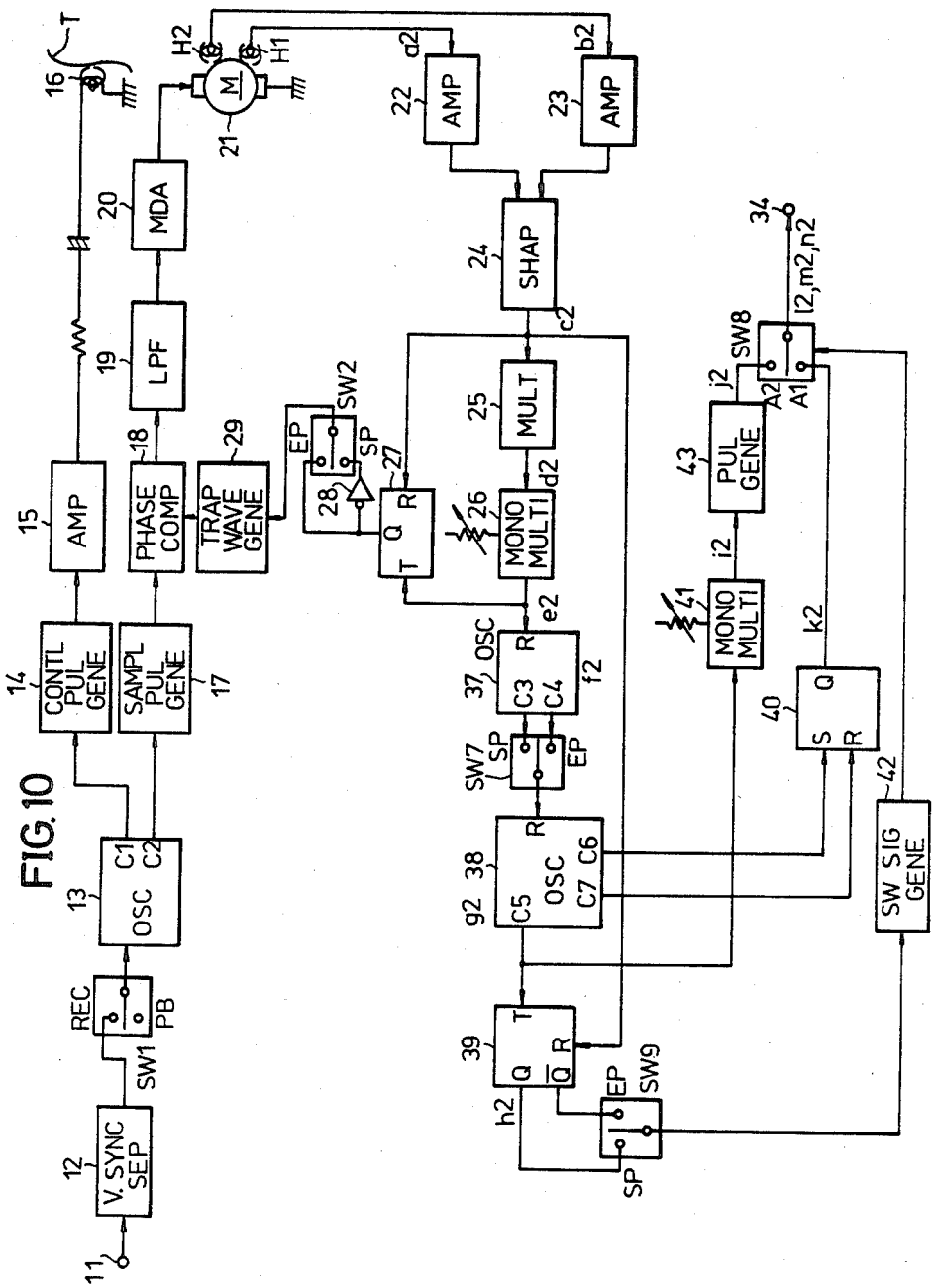

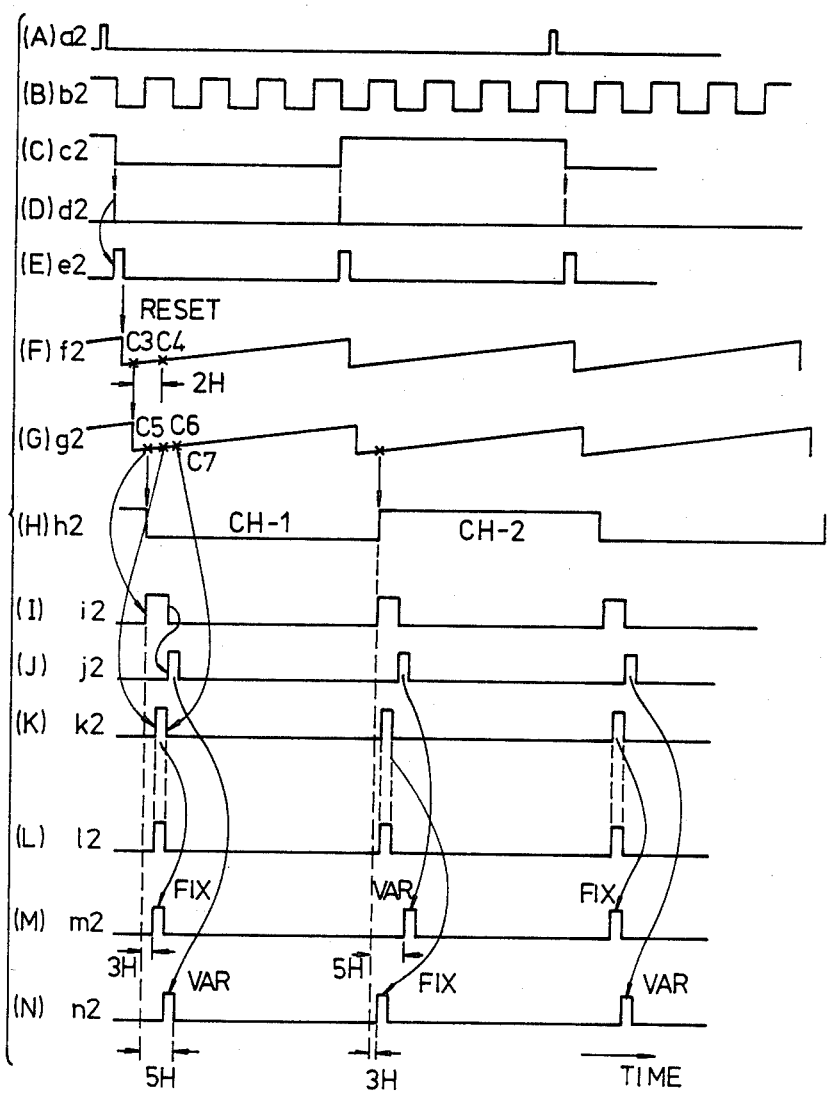

PSEUDO VERTICAL SYNCHRONIZING SIGNAL PRODUCING CIRCUIT

BACKGROUND OF THE INVENTION

The present invention generally relates to pseudo vertical synchronizing signal producing circuits, and more particularly to a pseudo vertical synchronizing signal producing circuit for producing a pseudo vertical synchronizing signal which is used in place of a regular vertical synchronizing signal in a special reproduction mode of a magnetic recording and reproducing apparatus.

There are various helical scan type magnetic recording and reproducing apparatuses (hereinafter referred to as video tape recorders or simply VTRs) for recording and reproducing a video signal on and from a magnetic tape by use of rotary video heads. As systems in which the rotary video heads to be used are changed depending on a moving speed of the tape, there are a 4-head double-gap system, a 4-head 90° system, a 3-head double-gap system and the like.

For example, a VTR employing the 4-head double-gap system comprises a rotary drum mounted with a pair of mutually confronting standard play heads and a pair of mutually confronting expanded play heads. Each standard play head lags a corresponding expanded play head in a rotating direction of the rotary drum by a distance corresponding to two horizontal scanning periods on an outer peripheral surface of the rotary drum, for example. The standard play heads are used in a standard play mode, and the expanded play heads are used in an expanded play mode in which the tape is moved at a speed slower than that at the time of the standard play mode.

Two heads having gaps of the same azimuth angle, that is, a first standard play head and a first expanded play head leading a second standard play head which confronts the first standard play head, are used when carrying out a still reproduction in the standard play mode. Remaining two heads having gaps of the same azimuth angle, that is, the second standard play head and a second expanded play head leading the first standard play head which confronts the second standard play head, are used when carrying out a still reproduction in the expanded play mode. As a result, a level of a frequency modulated signal reproduced from the tape during the still reproduction if high, and it is possible to obtain a satisfactory still picture in the standard and expanded play modes.

The level of the frequency modulated signal reproduced in a normal reproduction mode is approximately constant. However, in a special reproduction mode, the heads scan obliquely to the tracks on the tape and traverse the tracks. As a result, the level of the frequency modulated signal reproduced in the special reproduction mode changes. When such a reproduced frequency modulated signal obtained in the special reproduction mode is detected, a vertical synchronizing signal may not be reproduced due to noise, and in this case, the vertical synchronism is disturbed in a reproduced picture.

In order to prevent the vertical synchronism in the reproduced picture from being disturbed by the absence of the reproduced vertical synchronizing signal, a pseudo vertical synchronizing signal is produced in a pseudo vertical synchronizing signal producing circuit. The pseudo vertical synchronizing signal is produced from a drum switching pulse signal which is used to switch outputs of the heads in the special reproduction mode, and the pseudo vertical synchronizing signal is inserted into the video signal in a vicinity of the regular vertical synchronizing signal. However, as will be described later on in the specification in conjunction with drawings, a conventional pseudo vertical synchronizing signal producing circuit uses monostable multivibrators respectively having an external variable resistor coupled externally thereto for each mode of the VTR. As a result, there are problems in that the number of external variable resistors is large, and that it is difficult to manufacture the pseudo vertical synchronizing signal producing circuuit in the form of an integrated circuit.

SUMMARY OF THE INVENTION

Accordingly, it is a general object of the present invention to provide a normal and useful pseudo vertical synchronizing signal producing circuit in which the problems described heretofore are eliminated.

Another and more specific object of the present invention is to provide a pseudo vertical synchronizing signal producing circuit which comprises only a small number of externally coupled elements. According to the circuit of the present invention, it is possible to manufacture the circuit in the form of an integrated circuit with ease.

Still another object of the present invention is to provide a pseudo vertical synchronizing signal producing circuit for a helical scan type magnetic recording and/or reproducing apparatus which comprises a plurality of rotary magnetic heads mounted on a rotary body, where the rotary magnetic heads record and/or reproduce a video signal on and/or from a magnetic tape and predetermined ones of the rotary magnetic heads are used for recording and/or reproduction depending on a mode of the recording and/or reproducing apparatus. The pseudo vertical synchronizing signal producing circuit produces a pseudo vertical synchronizing signal which is used instead of a regular vertical synchronizing signal of the video signal during a special reproduction mode of the recording and/or reproducing apparatus. The pseudo vertical synchronizing signal producing circuit comprises an input terminal applied with a first signal in synchronism with a rotation of the rotary body, a multiplying circuit for multiplying a frequency of the first signal by a predetermined coefficient so as to produce a second signal having a frequency greater than the frequency of the first signal, a counter circuit reset by the second signal for counting block pulses and for producing a third pulse signal consisting of pulses producing every time a counter value in the counter circuit reaches a predetermined threshold value, a signal producing circuit for producing a fourth pulse signal from the third pulse signal, where the fourth pulse signal has a timing delayed by a predetermined time with respect to a timing of the third pulse signal and the predetermined time corresponds to a difference in mounting positions of two mutually adjacent rotary magnetic heads which are mounted on the rotary body and are used in different modes of the recording and/or reproducing apparatus in a rotating direction of the rotary body, a switching signal producing circuit for producing a switching signal from an output signal of the counter circuit during a still reproduction mode of the recording and/or reproducing apparatus, a switching circuit for passing the third pulse signal during a search mode of the recording and/or reproducing apparatus and for alternately passing the third and fourth pulse signals responsive to the switching signal during the still reproduction mode, and an output circuit supplied with an output pulse signal of the switching circuit for producing the pseudo vertical synchronizing signal from the output pulse signal of the switching circuit and for outputting the pseudo vertical synchronizing signal. According to the pseudo vertical synchronizing signal of the present invention, it is unnecessary to provide a large number of monostable multivibrators and couple a large number of external variable resistors thereto, and the circuit can be manufactured in the form of an integrated circuit with ease.

A further object of the present invention is to provide a pseudo vertical synchronizing signal producing circuit comprising a first counter circuit having a predetermined oscillation frequency for counting clock pulses and for producing a first pulse signal consisting of pulses produced every time a counted value in the first counter circuit reaches a first threshold value and a second pulse signal consisting of pulses produced every time the counted value reaches a second threshold value greater than the first threshold value, a second counter circuit reset by the second signal for counting the clock pulses and for producing a third pulse signal consisting of pulses produced every time a counted value in the second counter circuit reaches a third threshold value and a fourth pulse signal consisting of pulses produced every time the counted value reaches a fourth threshold value greater than the third threshold value, a signal producing circuit for producing a fifth pulse signal from the third pulse signal, where the fifth pulse signal has a timing delayed by a predetermined time with respect to a timing of the third pulse signal and the predetermined time corresponds to a difference in mounting positions of two mutually adjacent rotary magnetic heads which are mounted on the rotary body and are used in different modes of the recording and/or reproducing apparatus in a rotating direction of the rotary body, a switching signal producing circuit for producing a switching signal from an output signal of the second counter circuit during a still reproduction mode of the recording and/or reproducing apparatus, a switching circuit for passing the fourth pulse signal during a search mode of the recording and/or reproducing apparatus and for alternately passing the fourth and fifth pulse signals responsive to the switching signal during the still reproduction mode, and an output circuit supplied with an output pulse signal of the switching circuit for producing the pseudo vertical synchronizing signal from the output pulse signal of the switching circuit and for outputting the pseudo vertical synchronizing signal. According to the pseudo vertical synchronizing signal of the present invention, it is unnecessary to provide a large number of monostable multivibrators and couple a large number of external variable resistors thereto, and the circuit can be manufactured in the form of an integrated circuit with ease.

Other objects and further features of the present invention will be apparent from the following detailed description when read in conjunction with the accompanying drawings.

BRIEF DESCRIPTION OF THE DRAWINGS

FIGS. 1A, 1B and 1C are plan views respectively showing mounting positions of rotary video heads on a rotary drum;

FIGS. 2(A) and 2(B), FIGS. 3(A) through 3(D) and FIGS. 4(A) through 4(D) respectively are timing charts for explaining timings of vertical synchronizing pulses;

FIG. 10 is a system block diagram showing a first embodiment of the pseudo vertical synchronizing signal producing circuit according to the present invention;

FIGS. 12(A) through 12(N) show signal waveforms for explaining the operations of the block systems shown in FIGS. 10 and 11;

DETAILED DESCRIPTION

As systems in which rotary video heads to be used are changed depending on a moving speed of a magnetic tape, there are a 4-head double-gap system, a 4-head 90° system, a 3-head double-gap system and the like.

For example, as shown in FIG. 1A, a VTR employing the 4-head double-gap system comprises a rotary drum 10 mounted with a pair of mutually confronting standard play heads SP1 and SP2 and a pair of mutually confronting expanded play heads EP1 and EP2. The standard play head SP1 (or SP2) lags a corresponding expanded play head EP2 (or EP1) in a rotating direction A of the rotary drum 10 by a distance corresponding to 2H on an outer peripheral surface of the rotary drum 10, for example, where H denotes one horizontal scanning period. The standard play heads SP1 and SP2 are used in a standard play mode, and the expanded play heads EP1 and EP2 are used in an expanded play mode in which the tape (not shown) is moved at a speed slower than that at the time of the standard play mode.

The two heads EP2 and SP2 having gaps of the same azimuth angle are used when carrying out a still reproduction in the standard play mode. On the other hand, the two heads EP1 and SP1 having gaps of the same azimuth angle are used when carrying out a still reproduction in the expanded play mode. As a result, a level of frequency modulated (FM) signal reproduced from the tape during the still reproduction is high, and it is possible to obtain a satisfactory still picture in the standard and expanded play modes.

The level of the FM signal reproduced in a normal reproduction mode is approximately constant (or flat) as shown in FIG. 2(A). However, in a special reproduction mode, the heads scan obliquely to the tracks on the tape and traverse the tracks. As a result, the level of the FM signal reproduced in the special reproduction mode changes as shown in FIG. 2(B).

A VTR employing the 4-head 90° system comprises the rotary drum 10 mounted with a pair of mutually confronting standard play heads SP1 and SP2 and a pair of mutually confronting expanded play heads EP1 and EP2. The standard play head SP1 (or SP2) lags a corresponding expanded play head EP1 (or EP2) in a rotating direction A of the rotary drum 10 by 90°. In the special reproduction mode, the level of the reproduced FM signal changes as shown in FIG. 3(A).

Figure 4:
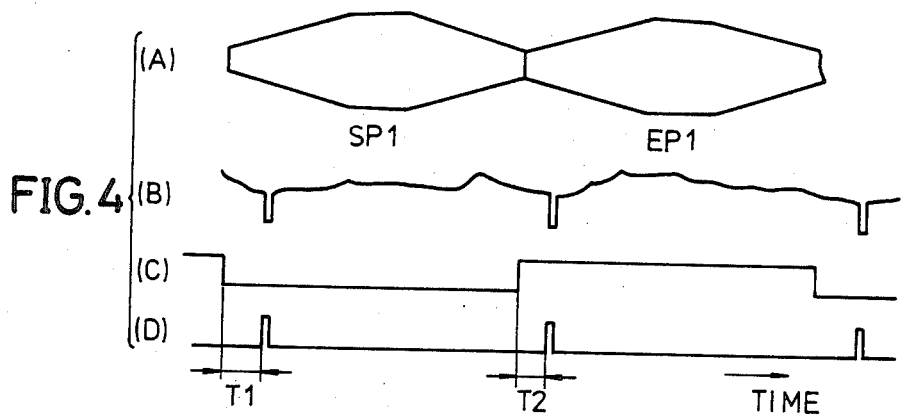

A VTR employing the 3-head double-gap system comprises the rotary drum 10 mounted with a pair of mutually confronting expanded play heads EP1 and EP2 and a standard play head SP1. The standard play head SP1 lags the expanded play head EP2 by a distance corresponding to 2H on the outer peripheral surface of the rotary drum 10. In the special reproduction mode, the level of the reproduced FM signal changes as shown in FIG. 4(A).

When the reproduced FM signal which is obtained in the special reproduction mode and has the level change is detected, a vertical synchronizing signal may not be reproduced due to noise, and in this case, the vertical synchronism is disturbed in a reproduced picture. In order to prevent the vertical synchronism in the reproduced picture from being disturbed by the absence of the reproduced vertical synchronizing signal, a pseudo vertical synchronizing signal shown in FIG. 3(D) (or 4(D)) is produced in a pseudo vertical synchronizing signal producing circuit. The pseudo vertical snychronizing signal is produced from a drum switching pulse signal shown in FIG. 3(C) (or 4(C)) which is used to switch outputs of the heads in the special reproduction mode, and the pseudo vertical synchronizing signal is inserted into a video signal shown in FIG. 3(B) (or 4(B)) in a vicinity of the regular vertical synchronizing signal. As will be described later, vertical synchronizing pulses having a pulse width of 3H are produced by delaying the drum switching pulse signal by a predetermined delay time. An interval T1 between the leading edge of the vertical synchronizing pulse and the trailing edge of the drum switching pulse and an interval T2 between the leading edge of the vertical synchronizing pulse and the leading edge of the drum switching pulse satisfy the relations T2−T1=2H for the standard play mode and T1−T2=2H for the expanded play mode.

Figure 5:
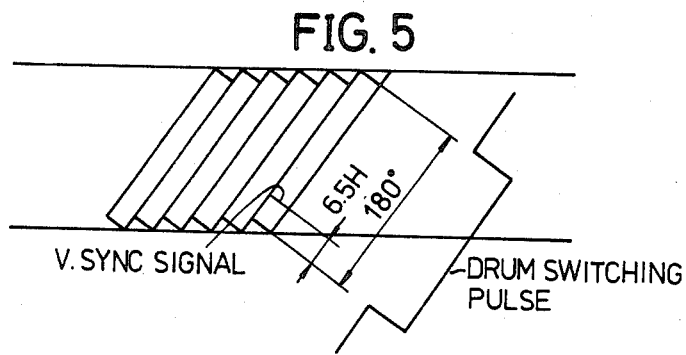
FIG. 5 shows a track pattern for explaining a timing of a drum switching pulse signal.

The drum switching pulse signal must have such a timing that the drum switching pulse signal falls and rises at the start and end of a 180° scan on the tape by the video head, as shown in FIG. 5, because of the need for a color rotation at the time of the recording and the need for the color rotation and the switching the FM signals at the time of the reproduction. In addition, there must be a time difference of (6.5±1.5)H between the vertical synchronizing signal of the video signal shown in FIG. 6(A) and a falling edge of the drum switching pulse signal shown in FIG. 6(B).

Figure 6:
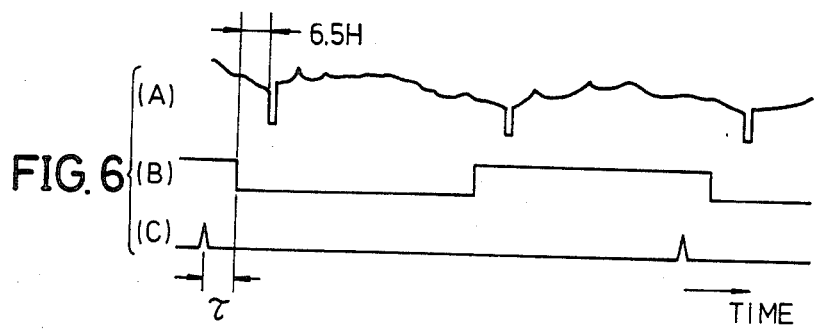
FIGS. 6(A) through 6(C) are timing charts for explaining the timing of the drum switching pulse signal.

As will be described later, a drum pulse signal shown in FIG. 6(C) is used to detect the stard and end of the 180° scan of the head so as to detect the falling and rising edges of the drum switching pulse signal. An error τ exists between the relative positions of the drum pulse sugnal and the video head, and this error τ is adjusted by a variable resistor coupled to a monostable multivibrator which produces the drum pulse signal.

The following table shows information such as a time difference between the vertical synchronizing pulses in two channels CH1 and CH2 for various modes in each of the three systems shown in FIGS. 1A, 1B and 1C. In the table, "Fix" means that the timing of the vertical synchronizing pulses is fixed, and "Var" means that the timing of the vertical synchronizing pulses can be variably adjusted in each apparatus. Furthermore, SP denotes the standard play mode, and EP denotes the expanded play mode.

TABLE

| | | System of FIG. 1A | System of FIG. 1B | System of FIG. 1C |
|---|---|---|---|---|
| Search in SP & EP Modes | Difference in V. Sync Pulses of CH1 & CH2 | None | None | None |
| | Timing Adjustment | Fix, Fix | Fix, Fix | Fix, Fix |
| Still in SP Mode | Heads Used | EP2, SP2 | SP1, SP2 | EP1, SP1 |
| | Kind of Still | Field | Frame | Field |
| | Difference in V. Sync Pulses of CH1 & CH2 | 2H | 1.5H | −2H |
| | Timing Adjustment | Fix Var | Fix Var | Var Fix |
| Still in EP Mode | Heads Used | EP1, SP1 | EP1, EP2 | EP1, SP1 |
| | Kind of Still | Field | Frame | Field |
| | Difference in V. Sync Pulses of CH1 & CH2 | −2H | None | −2H |
| | Timing Adjustment | Var Fix | Fix Fix | Var Fix |

Figure 7:
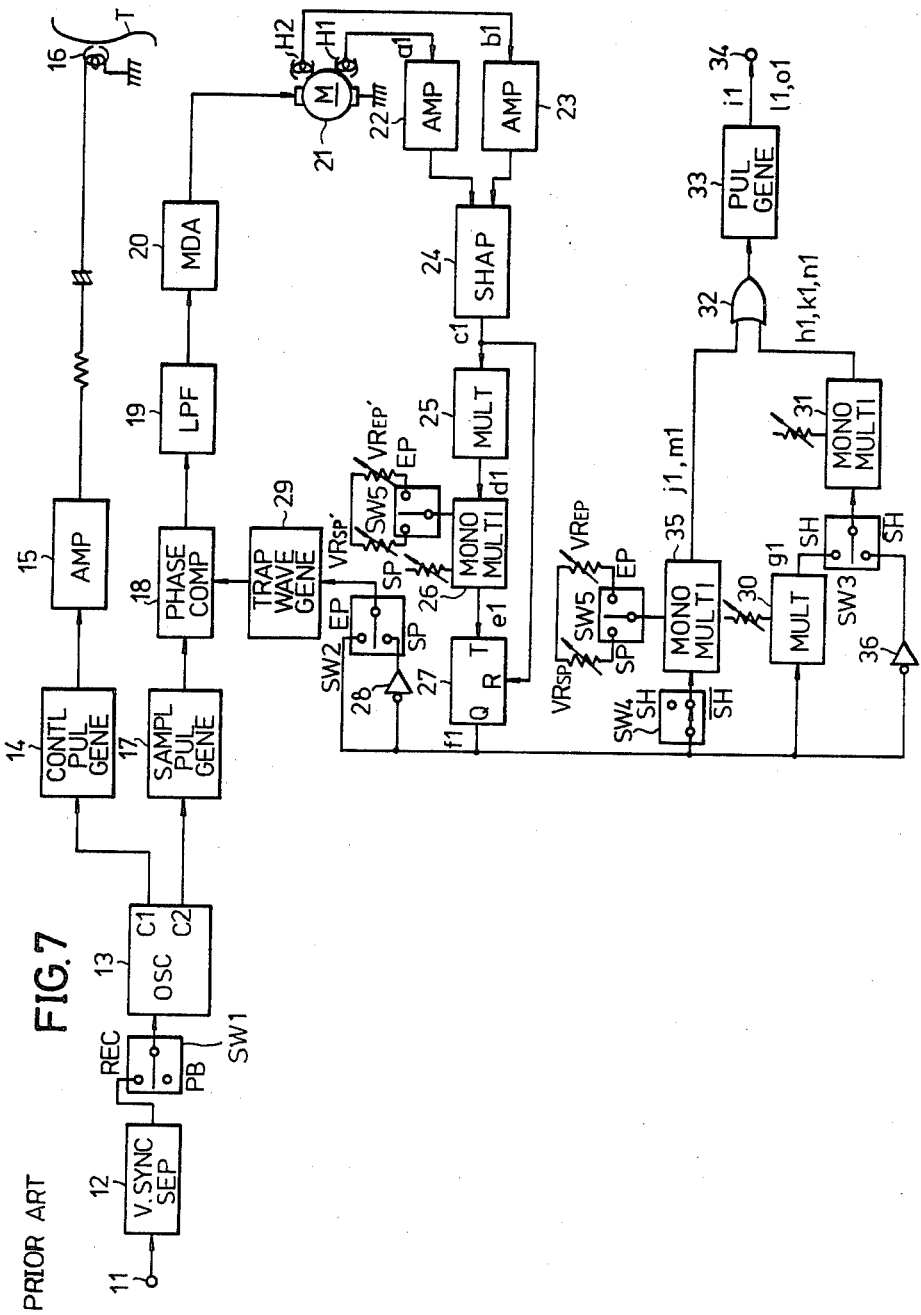
FIG. 7 is a system block diagram showing an example of the conventional pseudo vertical synchronizing signal producing circuit.

FIG. 7 shows the block system of an example of the conventional pseudo vertical synchronizing signal producing circuit. In a recording mode, a video signal applied to an input terminal 11 is supplied to a vertical synchronizing signal separating circuit 12, and a separated vertical synchronizing signal from the vertical synchronizing signal separating circuit 12 is applied to a terminal REC of a switch SW1. The switch SW1 is connected to the terminal REC in the recording mode. The vertical synchronizing signal from the switch SW1 is supplied to an oscillator (counter) circuit 13. The oscillator circuit 13 is reset by the vertical synchronizing signal and is designed to count clock pulses and to produce a signal of 30 Hz. A pulse is produced from a terminal C1 when a counted value in the oscillator circuit 13 reaches a first threshold value C1, and a pulse is produced from a terminal C2 when the counted value reaches a second threshold value C2. Hence, a pulse signal of 30 Hz which is in synchronism with the vertical synchronizing signal is produced from the terminal C1, and a pulse signal of 30 Hz is produced from the terminal C2. The second threshold value C2 is greater than the threshold value C1. The pulse signal from the terminal C1 of the oscillator circuit 13 is supplied to a control pulse generating circuit 14 wherein the pulse signal is formed into a control pulse signal. The control pulse signal is passed through a recording amplifier 15 and is recorded on a magnetic tape T by a control head 16.

Figure 9:
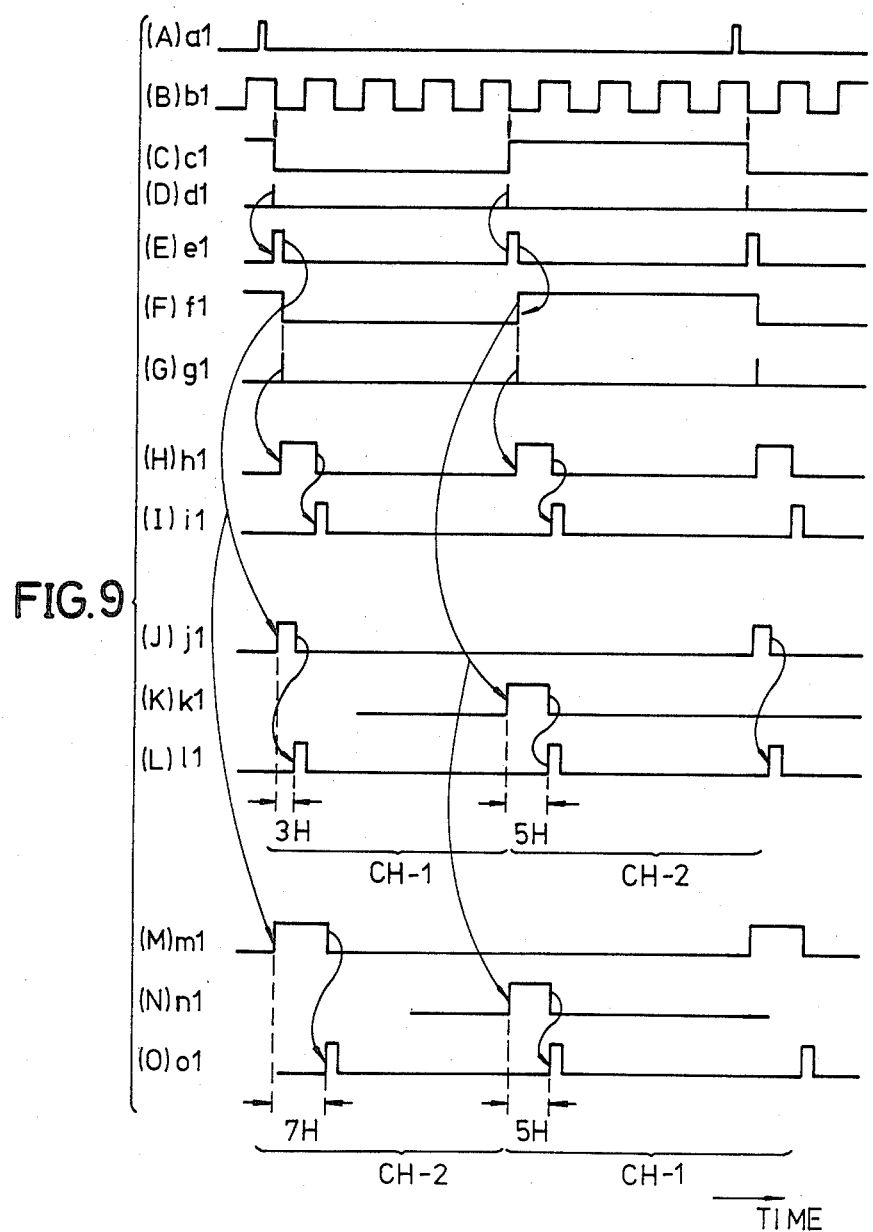
FIGS. 9(A) through 9(O) show signal waveforms for explaining the operations of the block systems shown in FIGS. 7 and 8.

In a drum servo system, the pulse signal from the terminal C2 of the oscillator circuit 13 is supplied to a sampling pulse generating circuit 17 and is formed into a sampling pulse signal. The sampling pulse signal is supplied to a phase comparator 18. A drum pulse signal (or a rotational phase detection signal) al shown in FIG. 9(A) is obtained from a head H1 which detects a rotational phase of a drum motor 21. On the other hand, a speed detection pulse signal b1 shown in FIG. 9(B) is obtained from a head H2 which detects a rotational speed of the motor 21. Arrangements for detecting the rotational phase and the rotational speed of the motor 21 are known, and description thereof will be omitted. The drum pulse signal al and the speed detection pulse signal b1 are passed through respective amplifiers 22 and 23 and are supplied to a shaping circuit 24 which shapes the signals into a signal c1 shown in FIG. 9(C). The frequency of the signal c1 is multiplied by two in a multiplying circuit 25, and an output signal d1 of the multiplying circuit 25 shown in FIG. 9(D) is formed into a signal e1 shown in FIG. 9(E) in a monostable multivibrator 26. The output signal e1 of the monostable multivibtator 26 is supplied to a flip-flop 27 which produces a drum switching pulse signal f1 shown in FIG. 9(F).

The drum switching pulse signal f1 is supplied as it is to a trapezoidal wave generating circuit 29 through a switch SW2 which is connected to a terminal EP in the expanded play mode, and is supplied to the trapezoidal wave generating circuit 29 after being inverted in an inverter 28 through the switch SW2 which is connected to a terminal SP in the standard play mode. The trapezoidal wave generating circuit 29 generates a trapezoidal wave signal and supplies this trapezoidal wave signal to the phase comparator 18. The phase comparator 18 compares the phases of the sampling pulse signal and the trapezoidal wave signal, and supplies a phase error signal to a lowpass filter 19. An output signal of the lowpass filter 19 is supplied to a motor driving circuit 20 which produces a signal for controlling the motor 21. The output signal of the motor driving circuit 20 is supplied to the motor 21.

In the normal reproduction mode, the oscillator circuit 13 produces a signal of 30 Hz in a free-running state, and the motor 21 is controlled similarly as described heretofore.

Description will be given with respect to the operation in the special reproduction mode. During a search, the frequency of the drum switching pulse signal f1 is multiplied by two in a multiplying circuit 30, and an output signal g1 of the multiplying circuit 30 is supplied to a monostable multivibrator 31 through a switch SW3 which is connected to a terminal SH during the search. An output signal h1 of the monostable multivibrator 31 shown in FIG. 9(H) is passed through an OR circuit 32 and is supplied to a vertical synchronizing pulse generating circuit 33 which produces a pseudo vertical synchronizing signal i1 shown in FIG. 9(I). The pseudo vertical synchronizing signal i1 is supplied to an output terminal 34.

On the other hand, during a still reproduction in the standard play mode, the drum switching pulse signal f1 is supplied to a monostable multivibrator 35 through a switch SW4 which is connected to a terminal $\overline{SH}$ during the still reproduction. Variable resistors $VR_{SP}$ and $VR_{EP}$ are coupled to the monostable multivibrator 35 through a switch SW5 which is connected to a terminal SP in the standard play mode and to a terminal EP in the expanded play mode. Hence, in the standard play mode, a time constant of the monostable multivibrator 35 is set to 3H by the variable resistor $VR_{SP}$, and a signal j1 shown in FIG. 9(J) is produced from the monostable multivibrator 35. The drum switching pulse signal f1 is also inverted in an inverter 36 and is supplied to the monostable multivibrator 31 through the switch SW3 which is connected to a terminal $\overline{SH}$. The monostable multivibrator 31 produces a signal k1 shown in FIG. 9(K) having a pulse width of 5H. The signals j1 and k1 are supplied to the OR circuit 32 and an output signal of the OR circuit 32 is formed into a pseudo vertical synchronizing signal l1 shown in FIG. 9(L) by the vertical synchronizing pulse generating circuit 33, and the pseudo vertical synchronizing signal l1 is supplied to the output terminal 34.

During a still reproduction in the expanded play mode, the drum switching pulse signal f1 is formed into a signal m1 shown in FIG. 9(M) in the monostable multivibrator 35 having the time constant thereof set to 7H by the variable resistor $VR_{EP}$. In addition, the drum switching pulse signal f1 is inverted in the inverter 36 and is formed into a signal n1 shown in FIG. 9(N) having a pulse width of 5H in the monostable multivibrator 31. The signal n1 is identical to the signal k1 described before. The signals m1 and n1 are supplied to the OR circuit 33 and an output signal of the OR circuit 33 is formed into a pseudo vertical synchronizing signal o1 shown in FIG. 9(O) in the vertical synchronizing pulse generating circuit 33. The pseudo vertical synchronizing signal o1 is supplied to the output terminal 34.

Figure 8:
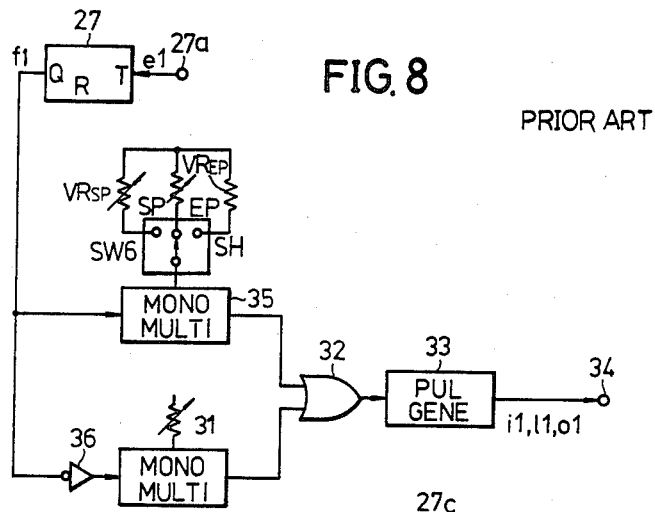
FIG. 8 is a system block diagram showing an essential part of another example of the conventional pseudo vertical synchronizing signal producing circuit.

FIG. 8 shows the block system of an essential part of another example of the conventional pseudo vertical synchronizing signal producing circuit. In FIG. 8, those parts which are the same as those corresponding parts in FIG. 7 are designated by the same reference numerals, and description thereof will be omitted. The output signal e1 of the monostable multivibrator 26 is applied to an output terminal 27a. In this other conventional circuit, a switch SW6 is provided to switch the time constant of the monostable multivibrator 35 depending on whether the operation of the VTR is a search, still reproduction in the standard play mode or a still reproduction in the expanded play mode. The switch SW6 is connected to a terminal SP during the standard play mode, to a terminal EP during the expanded play mode and to a terminal SH during the search. Hence, it is possible to obtain the pseudo vertical synchronizing signal as in the case of the conventional circuit shown in FIG. 7, without the use of the multiplying circuit 30.

However, the conventional circuits shown in FIGS. 7 and 8 are designed to switch over the externally coupled variable resistors $VR_{SP}$ and $VR_{EP}$ of the monostable multivibrator 35 so as to determine the time constant thereof, depending on whether the pseudo vertical synchronizing signal is to be produced for the still reproduction in the standard play mode or for the still reproduction in the expanded play mode. Furthermore, there is a relative timing difference (for example, 2H in the case of the 4-head double-gap system) between the drum switching pulse signal in the standard play mode and the drum switching pulse signal in the expanded play mode. Hence, in FIG. 7, a switch SW5 is coupled to the monostable multivibrator 26 so as to couple a variable resistor $VR_{SP}$ or $VR_{EP}$ to the monostable multivibrator 26 depending on the play mode of the VTR.

As a result, the conventional circuits suffer disadvantages in that a large number of external variable resistors must be coupled to the monostable multivibrators and that the circuits are unsuited to be manufactured in the form of integrated circuits.

The present invention eliminates the disadvantages of the conventional circuits by requiring only a small number of externally coupled elements.

FIG. 10 shows the block system of a first embodiment of the pseudo vertical synchronizing signal producing circuit according to the present invention. In FIG. 10, those parts which are the same as those corresponding parts in FIG. 7 are designated by the same reference numerals, and description thereof will be omitted. Output signals a2 and b2 of the heads H1 and H2 are respectively shown in FIGS. 12(A) and 12(B). Output signals c2, d2 and e2 of the shaping circuit 24, the multiplying circuit 25 and the monostable multivibrator 26 are shown in FIGS. 12(C), 12(D) and 12(E), respectively.

The signal e2 resets an oscillator (counter) circuit 37 which is designed to count clock pulses and to produce a signal f2 of 60 Hz shown in FIG. 12(F). A pulse signal is produced from a terminal C3 when a counted value reaches a first threshold value C3, and a pulse signal is produced from a terminal C4 when the counted value reaches a second threshold value C4 which is greater than the threshold value C3. The output pulse signal of the oscillator circuit 37 is supplied to an oscillator (counter) circuit 38 through a switch SW7 which is connected to a terminal SP in the standard play mode and is connected to a terminal EP in the expanded play mode. The oscillator circuit 37 is reset by the output signal of the switch SW7 and is designed to count clock pulses and to produce a count signal g2 shown in FIG. 12(G). Threshold values C5, C6 and C7 are set in the oscillator circuit 38, where C5<C6<C7, and a pulse signal is produced through terminals C5, C6 and C7 when a counted value therein reaches the respective threshold values C5, C6 and C7. A flip-flop 39 is triggered by the pulse signal from the terminal C5 and produces a drum switching pulse signal h2 shown in FIG. 12(H) from an output terminal Q thereof. The pulse signals from the terminals C6 and C7 of the oscillator circuit 38 are respectively supplied to a set terminal S and a reset terminal R of a flip-flop 40. Hence, the flip-flop 40 is set after 3H from the time when the counted value reaches the threshold value C5 in the oscillator circuit 38, that is, when the counted value reaches the threshold value C6. On the other hand, the flip-flop 40 is reset after 3H from the time when the counted value in the oscillator circuit 38 reaches the threshold value C6, that is, when the counted value reaches the threshold value C7. As a result, a signal k2 shown in FIG. 12(K) is produced from the flip-flop 40 and is supplied to a terminal A1 of a switch SW8, and this signal k2 is supplied to the output terminal 34 as a pseudo vertical synchronizing signal l2 shown in FIG. 12(L).

On the other hand, the pulse signal from the terminal C5 of the oscillator circuit 38 is also supplied to a monostable multivibrator 41 having a time constant of 5H, and is formed into a signal i2 shown in FIG. 12(I). The signal i2 is formed into a signal j2 shown in FIG. 12(J) in a pulse generating circuit 43, and is applied to a terminal A2 of the switch SW8. The drum switching pulse signal h2 is supplied to a terminal SP of switch SW9, and an inverted drum switching pulse signal $\overline{h2}$ from an output terminal $\overline{Q}$ of the flip-flop 39 is supplied to a terminal EP of the switch SW9. The switch SW9 is connected to the terminal SP in the standard play mode, and is connected to the terminal EP in the expanded play mode. Hence, the drum switching pulse signal h2 from the switch SW9 is supplied to a switching signal generating circuit 42 during the still reproduction in the standard play mode, and the inverted drum switching pulse signal $\overline{h2}$ from the switch SW9 is supplied to the switching signal generating circuit 42 during the still reproduction in the expanded play mode. The switching signal generating circuit 42 produces a switching signal for alternately connecting the switch SW8 to the terminals A1 and A2 for every one field.

For this reason, during the still reproduction in the standard play mode, the signal k2 is obtained from the switch SW8 in a first field, the signal j2 is obtained in a second field, the signal k2 is obtained in a third field, . . . . In other words, the signal k2 and the signal j2 are alternately obtained from the switch SW8 for every one field, and a pseudo vertical synchronizing signal m2 shown in FIG. 12(M) is obtained from the output terminal 34. On the other hand, during the still reproduction in the expanded play mode, the signal j2 is obtained from the switch SW8 in the first field, the signal k2 is obtained in the second field, the signal j2 is obtained in the third field, . . . In other words, the signal j2 and the signal k2 are alternately obtained from the switch SW8 for every one field, and a pseudo vertical synchronizing signal n2 shown in FIG. 12(N) is obtained from the output terminal 34. In FIG. 12 and FIGS. 14, 16, 18 and 20 which will be described later, "FIX" means that the timing of the signal is fixed and "VAR" means that the timing of the signal is variable.

In actual practice, the pulse signal from the terminal C4 of the oscillator circuit 37 is supplied to the oscillator circuit 38 during the still reproduction in the expanded play mode. Hence, there is a relative time difference of 2H between the pseudo vertical synchronizing signal n2 obtained during the still reproduction in the expanded play mode and the pseudo vertical synchronizing signal m2 obtained during the still reproduction in the standard play mode.

According to the present embodiment, mutualy different threshold values are set in the oscillator circuits 37 and 38 and the signals j2 and k2 are obtained with predetermined timings based on the output signals of the oscillator circuits 37 and 38. The conventional circuits described before are provided with the external variable resistors which are selectively used depending on the play mode so as to produce the pseudo vertical synchronizing signal in accordance with the play mode. However, it is unnecessary to provide such external variable resistors in the present embodiment. Furthermore, the relative time difference between the standard play mode and the expanded play mode is obtained by use of the threshold values set in the oscillator circuit 37. Therefore, the circuit of the present embodiment can be manufactured in the form of an integrated circuit with ease.

Figure 11:
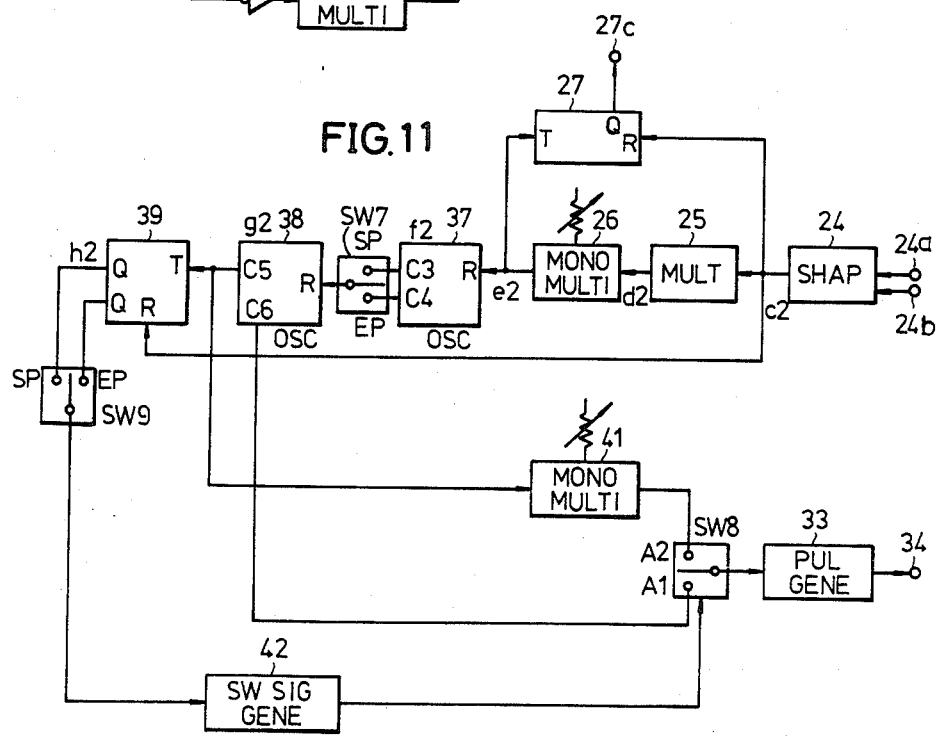
FIG. 11 is a system block diagram showing an essential part of a second embodiment of the pseudo vertical synchronizing signal producing circuit according to the present invention.

FIG. 11 shows the block system of an essential part of a second embodiment of the pseudo vertical synchronizing signal producing circuit according to the present invention. In FIG. 11, those parts which are the same as those corresponding parts in FIGS. 7 and 10 are designated by the same reference numerals, and description thereof will be omitted. In FIG. 11, the output signals of the amplifiers 22 and 23 are respectively applied to input terminals 24a and 24b. The output signal of the flip-flop 27 is supplied to a terminal 27c which is connected to the terminal EP of the switch SW2 and an input of the inverter 28 shown in FIG. 10. During the search, the pulse signal produced from the terminal C6 of the oscillator circuit 38 is formed into the pseudo vertical synchronizing signal 12 shown in FIG. 12(L) in the vertical synchronizing pulse generating circuit 33, and is obtained through the output terminal 34.

During the still reproduction in the standard play mode, the vertical synchronizing pulse generating circuit 33 generates the pseudo vertical synchronizing signal based on the pulse signal produced from the output terminal C6 of the oscillator circuit 38 in the first field, based on the falling edge of the output signal of the monostable multivibrator 41 having the time constant of 5H in the second field, . . . , and as a result, the pseudo vertical synchronizing signal m2 shown in FIG. 12(M) is generated from the vertical synchronizing pulse generating circuit 33 and is supplied to the output terminal 34. On the other hand, during the still reproduction in the expanded play mode, the vertical synchronizing pulse generating circuit 33 generates the pseudo vertical synchronizing signal based on the rising edge of the output signal of the monostable multivibrator 41 in the first field, based on the pulse signal produced from the output terminal C6 of the oscillator circuit 38 in the second field, . . . , and as a result, the pseudo vertical synchronizing signal n2 shown in FIG. 12(N) is generated from the vertical synchronizing pulse generating circuit 33 and is supplied to the output terminal 34.

Figure 13:
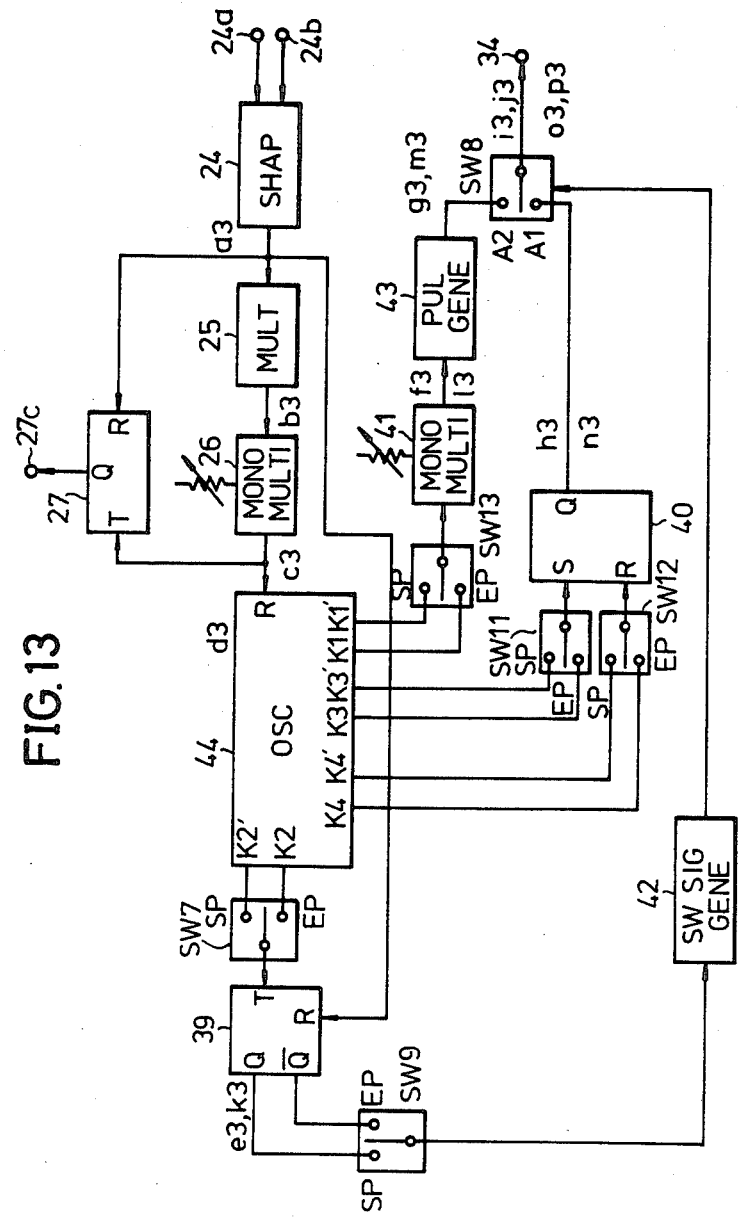
FIG. 13 is a system block diagram showing an essential part of a third embodiment of the pseudo vertical synchronizing signal producing circuit according to the present invention.
Figure 14:
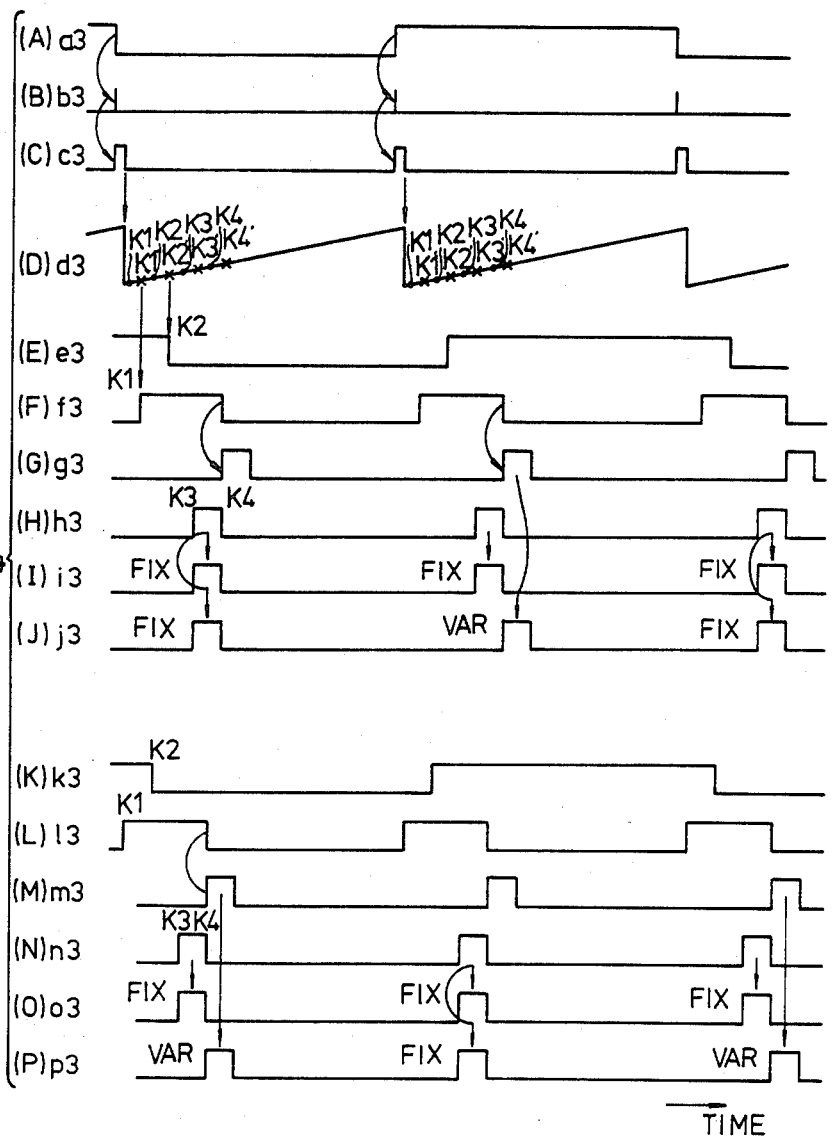
FIGS. 14(A) through 14(P) show signal waveforms for explaining the operation of the block system shown in FIG. 13.

FIG. 13 shows the block system of an essential part of a third embodiment of the pseudo vertical synchronizing signal generating circuit according to the present invention. In FIG. 13, those parts which are the same as those corresponding parts in FIGS. 10 and 11 are designated by the same reference numerals, and description thereof will be omitted. Output signals a3, b3 and c3 of the shaping circuit 24, the multiplying circuit 25 and the monostable multivibrator 26 shown in FIGS. 14(A), 14(B) and 14(C) respectively correspond to the signals c2, d2 and e2 shown in FIGS. 12(C), 12(D) and 12(E).

Threshold values K1, K1', K2, K2', K3, K3', K4 and K4' are set in an oscillator (counter) circuit 44, where K1<K1'<K2<K2'<K3<K3'<K4<K4'. The output signal c3 of the monostable multivibrator 26 is formed into a signal d3 shown in FIG. 14(D) in the oscillator circuit 44. During the still reproduction in the standard play mode, a pulse signal produced through a terminal K2' of the oscillator circuit 44 is passed through the switch SW7 and is supplied to the flip-flop 39, and the flip-flop 39 produces a drum switching pulse signal e3 shown in FIG. 14(E) from the output terminal Q thereof. On the other hand, during the still reproduction in the expanded play mode, a pulse signal produced through a terminal K2 of the oscillator circuit 44 is passed through the switch SW7 and is supplied to the flip-flop 39, and the flip-flop 39 produces a drum switching pulse signal k3 shown in FIG. 14(K) from the output terminal Q thereof.

Switches SW11, SW12 and SW13 are respectively connected to terminals SP in the standard play mode and connected to terminals EP in the expanded play mode. Hence, the flip-flop 40 is set by an output pulse signal from a terminal K3' of the oscillator circuit 44 in the standard play mode and by an output pulse signal from a terminal K3 in the expanded play mode. Furthermore, the flip-flop 40 is reset by an output pulse signal from a terminal K4' of the oscillator circuit 44 in the standard play mode and by an output pulse signal from a terminal K4 in the expanded play mode. As a result, the flip-flop 40 produces a signal h3 shown in FIG. 14(H) in the standard play mode and produces a signal n3 shown in FIG. 14(N) in the expanded play mode. The signal h3 is applied to the terminal A1 of the switch SW8 in the standard play mode, and a pseudo vertical synchronizing signal i3 shown in FIG. 14(I) is supplied to the output terminal 34 during the search in the standard play mode. On the other hand, the signal n3 is applied to the terminal A1 of the switch SW8 in the expanded play mode, and a pseudo vertical synchronizing signal o3 shown in FIG. 14(O) is supplied to the output terminal 34 during the search in the expanded play mode.

The monostable multivibrator 41 produces a signal f3 shown in FIG. 14(F) responsive to a pulse signal produced from a terminal K1' of the oscillator 44 and produces a signal l3 shown in FIG. 14(L) responsive to a pulse signal produced from a terminal K1. The signal f3 is formed into a signal g3 shown in FIG. 14(G) in the pulse generating circuit 43 and is applied to the terminal A2 of the switch SW8. The signal l3 is formed into a signal m3 shown in FIG. 14(M) in the pulse generating circuit 43 and is applied to the terminal A2 of the switch SW8. Due to the switching of the switch SW8 responsive to the output switching signal of the switching signal generating circuit 42, a pseudo vertical synchronizing signal j3 shown in FIG. 14(J) is supplied to the output terminal 34 during the still reproduction in the standard play mode and a pseudo vertical synchronizing signal p3 shown in FIG. 14(P) is supplied to the output terminal 34 during the still reproduction in the expanded play mode.

Figure 15:
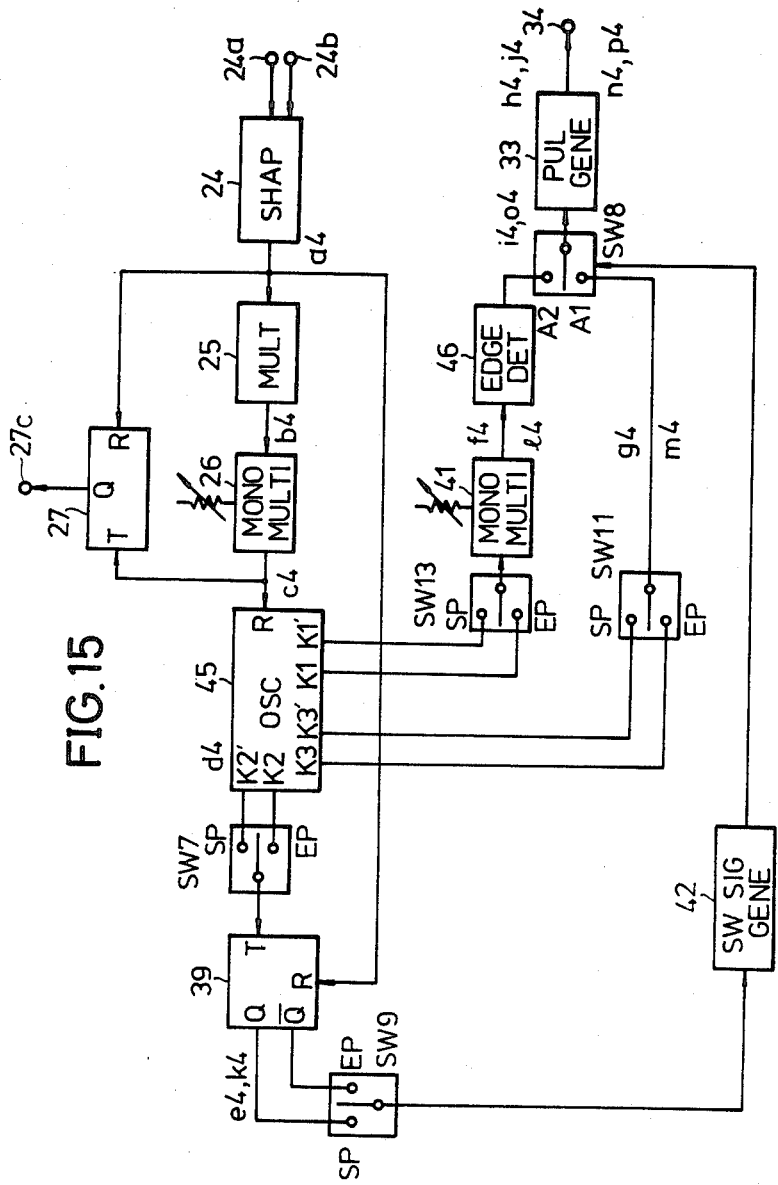
FIG. 15 is a system block diagram showing an essential part of a fourth embodiment of the pseudo vertical synchronizing signal producing circuit according to the present invention.
Figure 16:
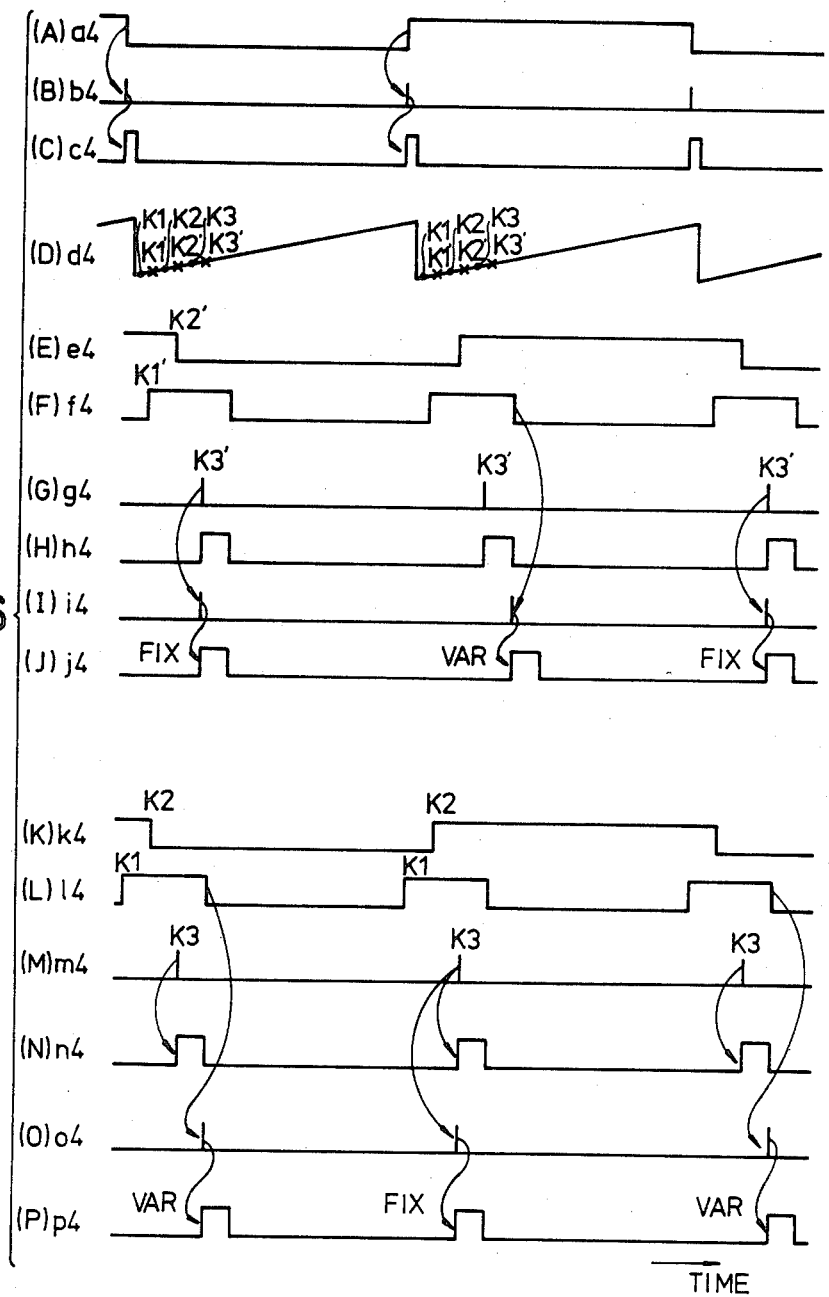
FIGS. 16(A) through 16(P) show signal waveforms for explaining the operation of the block system shown in FIG. 15.

FIG. 15 shows the block system of a fourth embodiment of the pseudo vertical synchronizing signal producing circuit according to the present invention. In FIG. 15, those parts which are the same as those corresponding parts in FIGS. 11 and 13 are designated by the same reference numerals, and description thereof will be omitted. Output signals a4, b4 and c4 of the shaping circuit 24, the multiplying circuit 25 and the monostable multivibrator 26 shown in FIGS. 16(A), 16(B) and 16(C) respectively correspond to the signals a3, b3 and c3 shown in FIGS. 14(A), 14(B) and 14(C). The threshold values K1, K1', K2, K2', K3 and K3' are set in an oscillator (counter) circuit 45.

The output signal c4 of the monostable multivibrator 26 is formed into a signal d4 shown in FIG. 16(D) in the oscillator circuit 45. During the still reproduction in the standard play mode, a pulse signal produced from a terminal K2' of the oscillator circuit 45 is passed through the switch SW7 and is supplied to the flip-flop 39, and the flip-flop 39 produces a drum switching pulse signal e4 shown in FIG. 16(E) from the output terminal Q thereof. On the other hand, during the still reproduction in the expanded play mode, a pulse signal produced from a terminal K2 of the oscillator circuit 45 is passed through the switch SW7 and is supplied to the flip-flop 39, and the flip-flop 39 produces a drum switching pulse signal k4 shown in FIG. 16(K) from the output terminal Q thereof.

The switch SW11 passes a signal g4 shown in FIG. 16(G) from a terminal K3' of the oscillator circuit 45 in the standard play mode and passes a signal m4 shown in FIG. 16(M) from a terminal K3 in the expanded play mode. The signal g4 is applied to the terminal A1 of the switch SW8 and the standard play mode, and a pseudo vertical synchronizing signal h4 shown in FIG. 16(H) is supplied to the output terminal 34 during the search in the standard play mode. On the other hand, the signal m4 is applied to the terminal A1 of the switch SW8 during the expanded play mode, and a pseudo vertical synchronizing signal n4 shown in FIG. 16(N) is supplied to the output terminal 34 during the search in the expanded play mode.

The monostable multivibrator 41 produces a signal f4 shown in FIG. 16(F) responsive to a pulse signal produced from a terminal K1' of the oscillator circuit 44 and produces a signal l4 shown in FIG. 16(L) responsive to a pulse signal produced from a terminal K1. The rising edge of the signal f4 is detected in an edge detecting circuit 46 and an output signal of the edge detecting circuit 46 is applied to the terminal A2 of the switch SW8. Similarly, the rising edge of the signal l4 is detected in the edge detecting circuit 46 and an output signal of the edge detecting circuit 46 is applied to the terminal A2 of the switch SW8. Due to the switching of the switch SW8 responsive to the output switching signal of the switching signal generating circuit 42, a pulse signal i4 is shown in FIG. 16(I) is supplied to the vertical synchronizing pulse generating circuit 33 in the standard play mode and a pulse signal o4 shown in FIG. 16(O) is supplied to the vertical synchronizing pulse generating circuit 33 in the expanded play mode. Therefore, a pseudo vertical synchronizing signal j4 shown in FIG. 16(J) is supplied to the output terminal 34 during the still reproduction in the standard play mode and a pseudo vertical synchronizing signal p4 shown in FIG. 16(P) is supplied to the output terminal 34 during the still reproduction in the expanded play mode.

Figure 17:
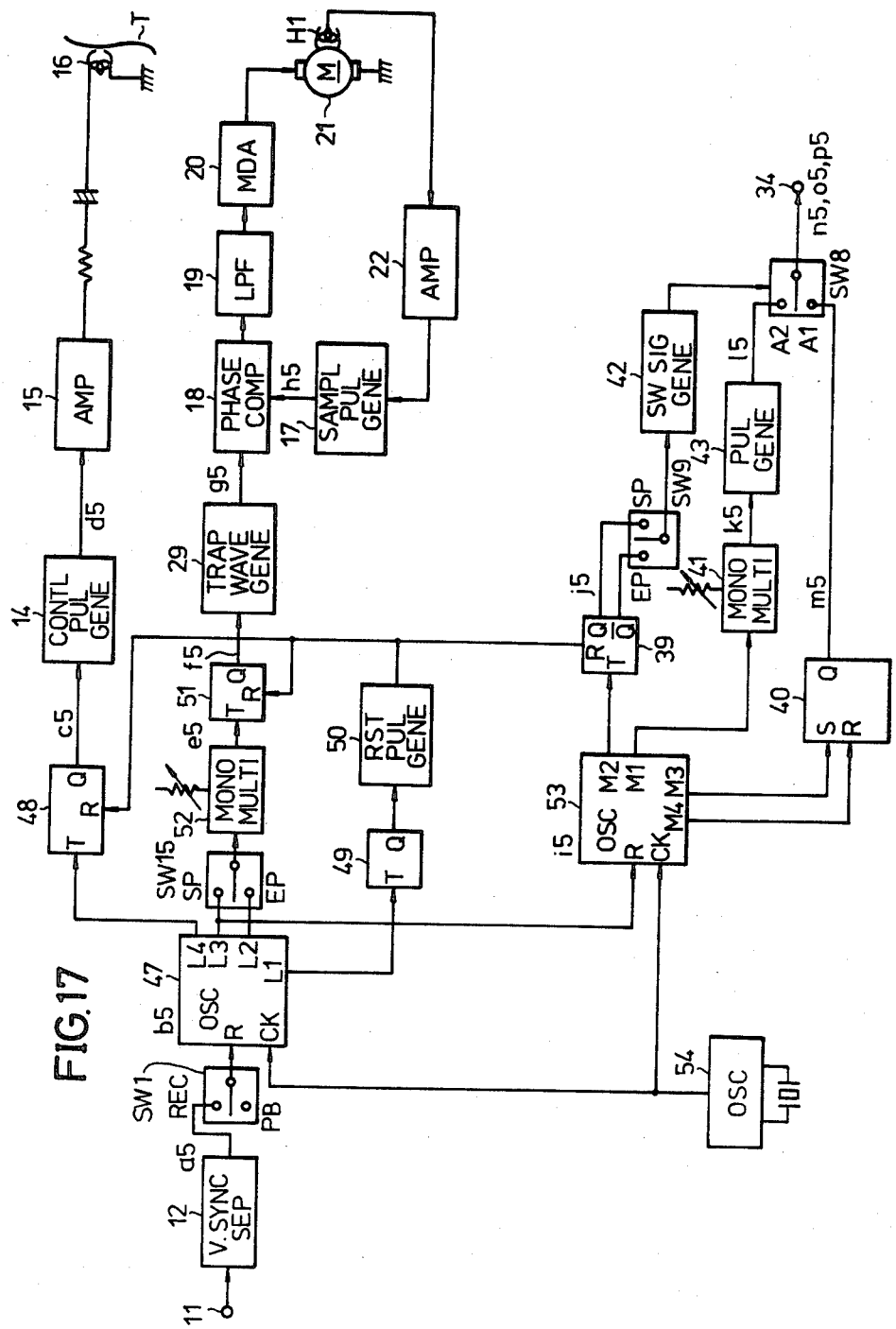
FIG. 17 is a system block diagram showing a fifth embodiment of the pseudo vertical synchronizing signal producing circuit according to the present invention.
Figure 18:
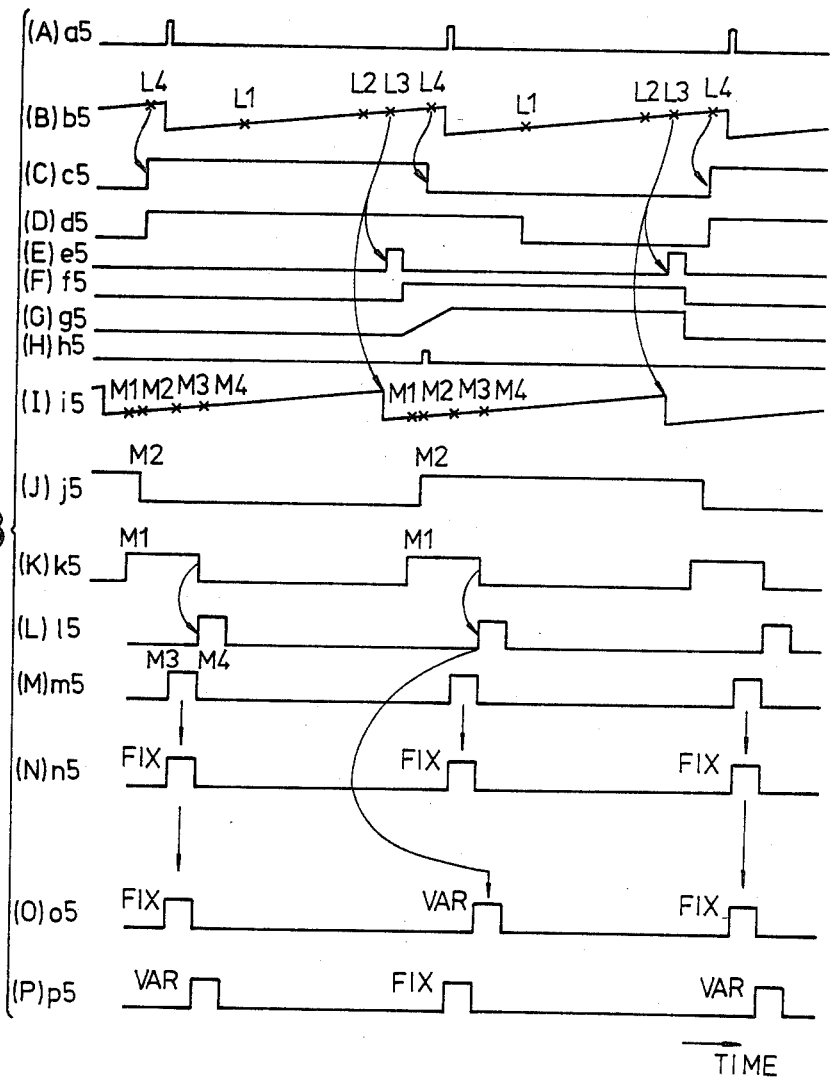
FIGS. 18(A) through 18(P) show signal waveforms for explaining the operation of the block system shown in FIG. 17.

FIG. 17 shows the block system of a fifth embodiment of the pseudo vertical synchronizing signal producing circuit according to the present invention. In FIG. 17, those parts which are the same as those corresponding parts in FIG. 10 are designated by the same reference numerals, and description thereof will be omitted. In the recording mode, a vertical synchronizing signal a5 shown in FIG. 18(A) is supplied to an oscillator (counter) circuit 47 which produces a count signal b5 shown in FIG. 18(B). On the other hand, in the reproducing mode, the oscillator circuit 47 produces a signal of 60 Hz in a free-running state. Threshold values L1, L2, L3 and L4 are set in the oscillator circuit 47, where $L1 < L2 < L3 < L4$. A pulse signal is produced from terminals L1, L2, L3 and L4 of the oscillator circuit 47 when a counted value reaches the respective threshold values L1, L2, L3 and L4. The pulse signal from the terminal L4 is supplied to a flip-flop 48, and an output signal c5 of the flip-flop 48 shown in FIG. 19(C) is supplied to the control pulse generating circuit 14. The control pulse generating circuit 14 generates a control pulse signal d5 shown in FIG. 18(D). As will be described later, the pulse signal from the terminal L1 is passed through a flip-flop 49 and is formed into a reset pulse signal in a reset pulse signal generating circuit 50. The output reset pulse signal of the reset pulse signal generating circuit 50 resets the flip-flop 48 and flip-flops 51 and 39 which will be described later.

A switch SW15 is connected to a terminal SP in the standard play mode and is connected to a terminal EP in the expanded play mode. In the standard play mode, a monostable multivibrator 52 produces a signal e5 shown in FIG. 18(E) responsive to the pulse signal from the terminal L3. This signal e5 is formed into a signal f5 shown in FIG. 18(F) in the flip-flop 51. The signal f5 is formed into a trapezoidal wave signal g5 shown in FIG. 18(G) in the trapezoidal wave generating circuit 29. The trapezoidal wave signal g5 is supplied to the phase comparator 18 and the phase thereof is compared with the phase of an output sampling pulse signal h5 of the sampling pulse generating circuit 17 shown in FIG. 18(H).

The oscillator circuit 47 and an oscillator (counter) circuit 53 are supplied with a clock pulse signal from a crystal oscillator 54. The output clock pulse signal of the crystal oscillator 54 is in synchronism with the pulse signal produced from the terminal L3 and has a frequency of 60 Hz. The oscillator circuit 53 counts the clock pulse signal and produces a count signal i5 shown in FIG. 18(I). Threshold values M1, M2, M3 and M4 are set in the oscillator circuit 53, where $M1 < M2 < M3 < M4$. A pulse signal is produced from terminals M1, M2, M3 and M4 of the oscillator circuit 53 when a counted value reaches the respective threshold values M1, M2, M3 and M4. The pulse signal from the terminal M2 is supplied to the flip-flop 39, and the flip-flop 39 produces a drum switching pulse signal j5 shown in FIG. 18(J). The flip-flop 40 is set by the pulse signal from the terminal M3 and is reset by the pulse signal from the terminal M4. Hence, the flip-flop 40 produces a signal m5 shown in FIG. 18(M). During the search in the standard and expanded play modes, the signal m5 is passed through the switch SW8 and is supplied to the output terminal 34 ad a pseudo vertical synchronizing signal n5 shown in FIG. 18(N).

The monostable multivibrator 41 produces a signal k5 shown in FIG. 18(K) responsive to the pulse signal from the terminal M1, and this signal k5 is formed into a signal l5 shown in FIG. 18(L) in the pulse generating circuit 43. Due to the switching of the switch SW8 responsive to the output switching signal of the switching signal generating circuit 42, a pseudo vertical synchronizing signal o5 is shown in FIG. 18(O) is supplied to the output terminal 34 during the still reproduction in the standard mode, and a pseudo vertical synchronizing signal p5 shown in FIG. 18(P) is supplied to the output terminal 34 during the still reproduction in the expanded play mode.

Figure 19:
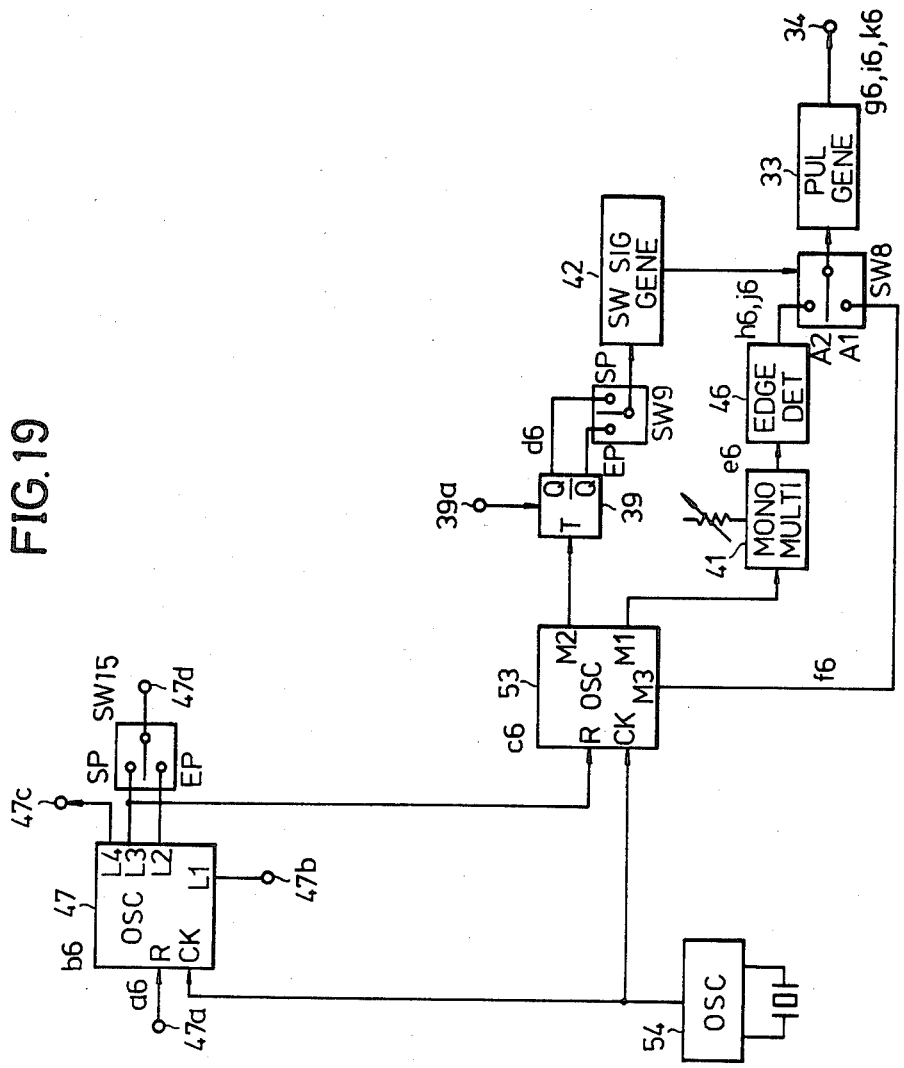
FIG. 19 is a system block diagram showing an essential part of a sixth embodiment of the pseudo vertical synchronizing signal producing circuit according to the present invention.
Figure 20:
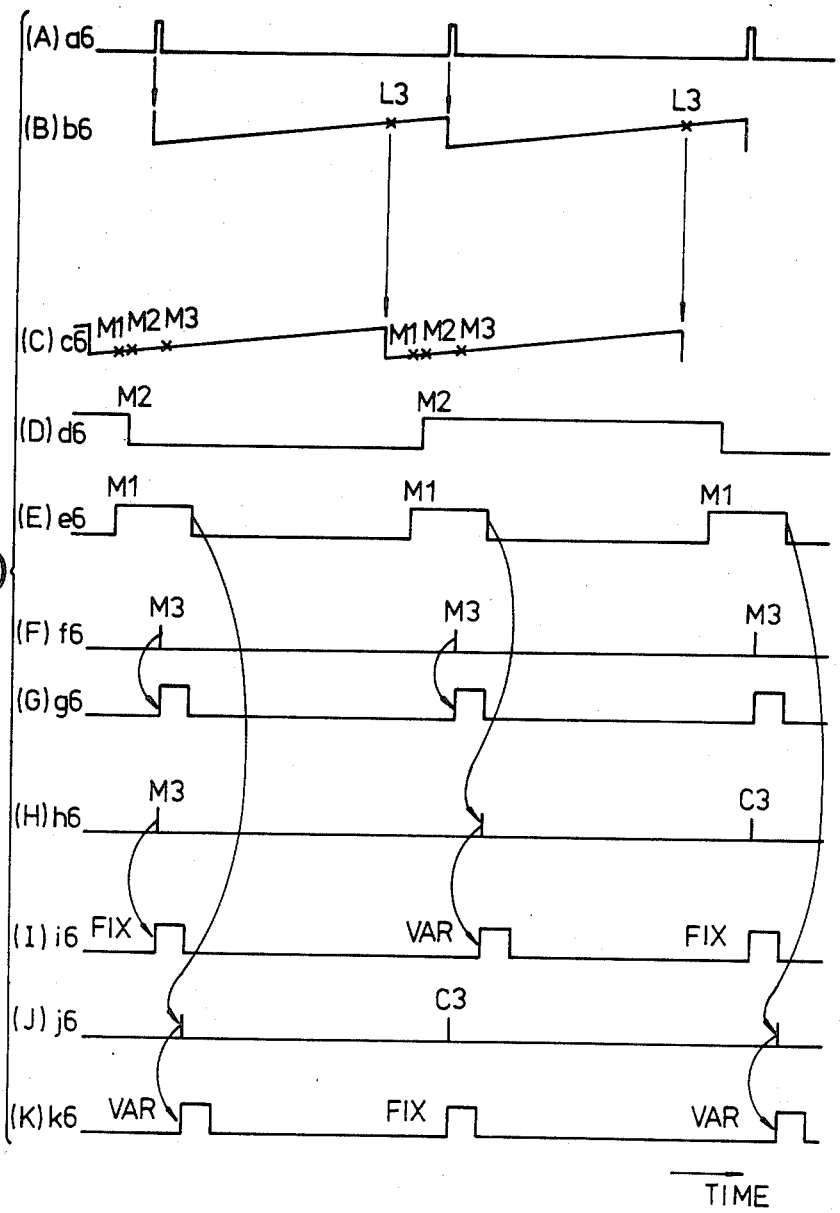
FIGS. 20(A) through 20(K) show signal waveforms for explaining the operation of the block system shown in FIG. 19.

FIG. 19 shows the block system of an essential part of a sixth embodiment of the pseudo vertical synchronizing signal producing circuit according to the present invention. In FIG. 19, those parts which are the same as those corresponding parts in FIG. 17 are designated by the same reference numerals, and description thereof will be omitted. Furthermore, the illustration of those parts of the circuit which are identical to those shown in FIG. 17 is omitted for convenience' sake. Signals a6, b6 and c6 shown in FIGS. 20(A), 20(B) and 20(C) respectively are identical to the signals a5, b5 and i5 shown in FIGS. 18(A), 18(B) and 18(I). A terminal 47a receives the output signal of the switch SW1, and a terminal 47b is coupled to the input of the flip-flop 49. A terminal 47c is coupled to the input of the flip-flop 48, and a terminal 47d is coupled to the input of the monostable multivibrator 52.

During the search, a pulse signal f6 shown in FIG. 20(F) produced from the terminal M3 of the oscillator circuit 53 is passed through the switch SW8, and a pseudo vertical synchronizing signal g6 shown in FIG. 20(G) is produced from the vertical synchronizing pulse generating circuit 33 and is supplied to the output terminal 34.

On the other hand, the monostable multivibrator 41 produces a signal e6 shown in FIG. 20(E) responsive to a pulse signal from the terminal M1. The edge detecting circuit 46 detects the falling edge of the signal e6. Due to the switching of the switch SW8, a signal h6 shown in FIG. 20(H) is supplied to the vertical synchronizing pulse generating circuit 33 and a pseudo vertical synchronizing signal i6 shown in FIG. 20(I) is supplied to the output terminal 34 during the still reproduction in the standard play mode. On the other hand, a signal j6 shown in FIG. 20(J) is supplied to the vertical synchronizing pulse generating circuit 33 and a pseudo vertical synchronizing signal k6 shown in FIG. 20(K) is supplied to the output terminal 34 during the still reproduction in the expanded play mode.

The embodiments are described heretofore for the case where the VTR employs the 4-head double-gap system. However, in the case where the present invention is applied to the VTR employing the 4-head 90° system, the same pseudo vertical synchronizing signal obtained for the search may be used as the pseudo vertical synchronizing signal for the still reproduction in the expanded play mode.

Furthermore, the switching signal used to control the switch SW8 is not limited to the output switching signal of the switching signal generating circuit. For example, in the case where the output of the oscillator circuit 13 is locked to the drum switching pulse signal, it is possible to control the switch SW8 by the output of the oscillator circuit 13.

In the embodiments described heretofore, the pseudo vertical synchronizing signal producing circuit uses oscillator (countere) circuits having threshold values set therein. Description will now be given with respect to an example of such an oscillator circuit.

Figure 21:
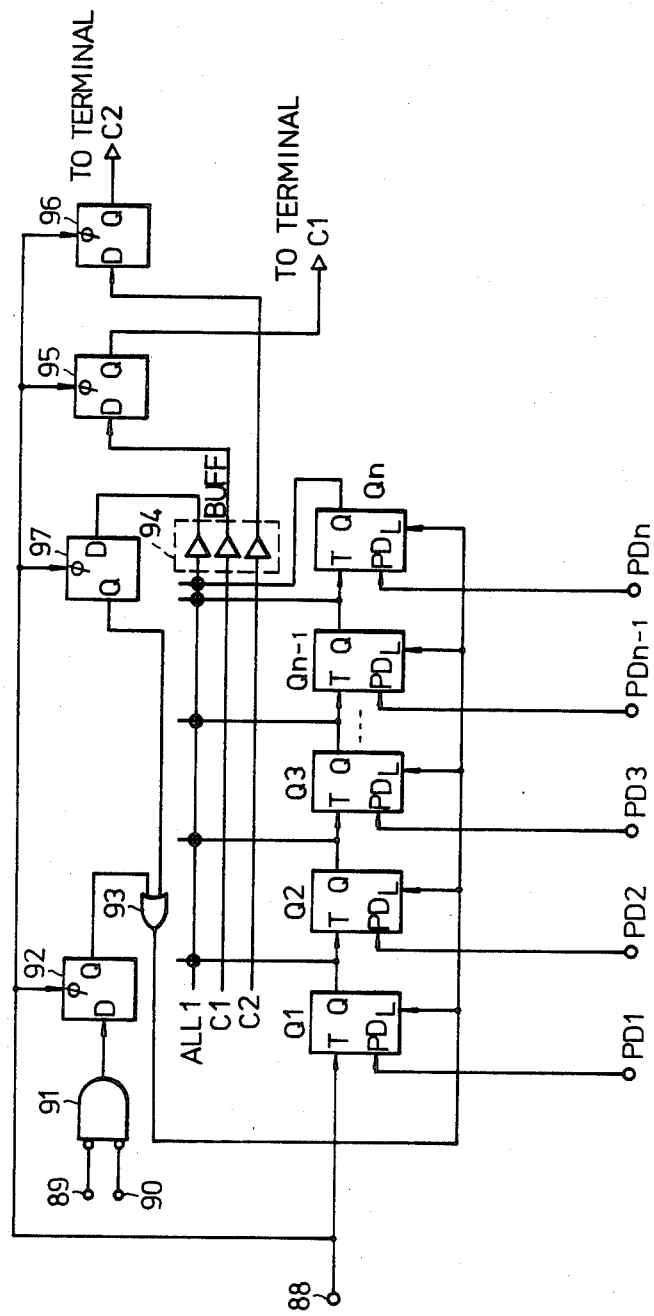
FIG. 21 shows an example of an oscillator circuit in which threshold values are set.

FIG. 21 shows the general construction of an example of the oscillator (counter) circuit having threshold values set therein. The construction of this oscillator circuit is known. For convenience' sake, it will be assumed that the oscillator circuit is set with two threshold values C1 and C2 as in the case of the oscillator circuit 13. In FIG. 21, a clock signal is applied to an input terminal 88 and is supplied to a counter constituted by n flip-flops Q1 through Qn. The separated vertical synchronizing signal is applied to an input terminal 89, and a pulse signal which has a high level during the recording mode is applied to an input terminal 90. An output signal of a gate circuit 91 is passed through a delay flip-flop 92 and an OR gate 93, and is supplied to load terminals L of the flip-flops Q1 through Qn. In addition, n-bit preset data in synchronism with the signal applied to the input terminal 89 are supplied to preset data terminals PD of the flip-flops Q1 through Qn from terminals PD1 through PDn and are loaded therein.

Output signals of the flip-flops Q1 through Qn are passed through a buffer 94 constituted by AND gates, and output signals of the buffer 94 are supplied to flip-flops 95 and 96 which respectively produce signals in accordance with the timings with which the threshold values C1 and C2 are reached. When all of the outputs of the flip-flops Q1 through Qn are high, a signal from the buffer 94 is passed through the flip-flop 97 and the OR gate and is applied to the load terminals L of the flip-flops Q1 through Qn.

Further, the present invention is not limited to these embodiments, but various variations and modifications may be made without departing from the scope of the present invention.

What is claimed is:

1. A pseudo vertical synchronizing signal producing circuit for a helical scan type magnetic recording and/or reproducing apparatus which comprises a plurality of rotary magnetic heads mounted on a rotary body, said rotary magnetic heads recording and/or reproducing a video signal on and/or from a magnetic tape, predetermined ones of said rotary magnetic heads being used for recording and/or reproduction depending on a mode of said recording and/or reproducing apparatus, said pseudo vertical synchronizing signal producing circuit producing a pseudo vertical synchronizing signal which is used instead of a regular vertical synchronizing signal of the video signal during a special reproduction mode of said recording and/or reproducing apparatus, said pseudo vertical synchronizing signal producing circuit comprising:
   input terminal means applied with a first signal in synchronism with a rotation of said rotary body;
   multiplying means for multiplying a frequency of said first signal by a predetermined coefficient so as to produce a second signal having a frequency greater than the frequency of said first signal;
   counter means reset by said second signal for counting clock pulses and for producing a third pulse signal consisting of pulses produced every time a counted value in said counter means reaches a predetermined threshold value;
   signal producing means for producing a fourth pulse signal from said third pulse signal, said fourth pulse signal having a timing delayed by a predetermined time with respect to a timing of said third pulse signal, said predetermined time corresponding to a difference in mounting positions of two mutually adjacent rotary magnetic heads which are mounted on said rotary body and are used in different modes of said recording and/or reproducing apparatus in a rotating direction of said rotary body;
   switching signal producing means for producing a switching signal from an output signal of said counter means during a still reproduction mode of said recording and/or reproducing apparatus;
   switching means supplied with said third and fourth pulse signals and said switching signal for passing said third pulse signal during a search mode of said recording and/or reproducing apparatus and for alternately passing said third and fourth pulse signals responsive to said switching signal during said still reproduction mode; and
   output circuit means supplied with an output pulse signal of said switching means for producing the pseudo vertical synchronizing signal from the output pulse signal of said switching means and for outputting the pseudo vertical synchronizing signal.

2. A pseudo vertical synchronizing signal producing circuit as claimed in claim 1 in which said output circuit means comprises an output terminal supplied with the output pulse signal of said switching means for producing the output pulse signal of said switching means as said pseudo vertical synchronizing signal.

3. A pseudo vertical synchronizing signal producing circuit as claimed in claim 2 in which said counter means comprises first counter means reset by said second signal for counting clock pulses and for producing a fifth pulse signal consisting of pulses produced every time a counted value in said first counter reaches a first threshold value and second counter means reset by said fifth pulse signal for counting clock pulses and for producing said third pulse signal consisting of pulses produced every time a counted value in said second counter means reaches a second threshold value, and said signal producing means comprises delay means for delaying said third pulse signal and pulse generating means for generating said fourth pulse signal from an output signal of said delay means.

4. A pseudo vertical synchronizing signal producing circuit as claimed in claim 2 in which said counter means produces said third pulse signal consisting of pulses produced every time a counted value in said counter reaches a first threshold value and produces a fifth pulse signal consisting of pulses produced every time the counted value reaches a second threshold value smaller than said first threshold value, and said signal producing means comprises delay means for delaying said fifth pulse signal and pulse generating means for generating said fourth pulse signal from an output signal of said delay means.

5. A pseudo vertical synchronizing signal producing circuit as claimed in claim 1 in which said output circuit means comprises pulse generating means supplied with the output signal of said switching means for generating the pseudo vertical synchronizing signal from the output signal of said switching means and an output terminal supplied with the output pseudo vertical synchronizing signal of said pulse generating means.

6. A pseudo vertical synchronizing signal producing circuit as claimed in claim 5 in which said counter means comprises first counter means reset by said second signal for counting clock pulses and for producing a fifth pulse signal consisting of pulses produced every time a counted value in said first counter reaches a first threshold value and second counter means reset by said fifth pulse signal for counting clock pulses and for producing said third pulse signal consisting of pulses produced every time a counted value in said second counter means reaches a second threshold value, and said signal producing means comprises delay means for delaying said third pulse signal and for producing said fourth pulse signal.

7. A pseudo vertical synchronizing signal producing circuit as claimed in claim 5 in which said counter means produces said third pulse signal consisting of pulses produced every time a counted value in said counter reaches a first threshold value and produces a fifth pulse signal consisting of pulses produced every time the counted value reaches a second threshold value smaller than said first threshold value, and said signal producing means comprises delay means for delaying said fifth pulse signal and edge detecting means for generating said fourth pulse signal by detecting edges of an output signal of said delay means.

8. A pseudo vertical synchronizing signal producing circuit as claimed in claim 1 in which said first signal has a frequency of 30 Hz and said second signal has a frequency of 60 Hz.

9. A pseudo vertical synchronizing signal producing circuit for a helical scan type magnetic recording and/or reproducing apparatus which comprises a plurality of rotary magnetic heads mounted on a rotary body, said rotary magnetic heads recording and/or reproducing a video signal on and/or from a magnetic tape, predetermined ones of said rotary magnetic heads being used for recording and/or reproduction depending on a mode of said recording and/or reproducing apparatus, said pseudo vertical synchronizing signal producing circuit producing a pseudo vertical synchronizing signal which is used instead of a regular vertical synchronizing signal of the video signal during a special reproduction mode of said recording and/or reproducing apparatus, said pseudo vertical synchronizing signal producing circuit comprising:

first counter means having a predetermined oscillation frequency for counting clock pulses and for producing a first pulse signal consisting of pulses produced every time a counted value in said first counter means reaches a first threshold value and a second pulse signal consisting of pulses produced every time the counted value reaches a second threshold value greater than said first threshold value;

second counter means reset by said second pulse signal for counting the clock pulses and for producing a third pulse signal consisting of pulses produced every time a counted value in said second counter means reaches a third threshold value and a fourth pulse signal consisting of pulses produced every time the counted value reaches a fourth threshold value greater than said third threshold value;

signal producing means for producing a fifth pulse signal from said third pulse signal, said fifth pulse signal having a timing delayed by a predetermined time with respect to a timing of said third pulse signal, said predetermined time corresponding to a difference in mounting positions of two mutually adjacent rotary magnetic heads which are mounted on said rotary body and are used in different modes of said recording and/or reproducing apparatus in a rotating direction of said rotary body;

switching signal producing means for producing a switching signal from an output signal of said second counter means during a still reproduction mode of said recording and/or reproducing apparatus;

switching means supplied with said fourth and fifth pulse signals and said switching signal for passing said fourth pulse signal during a search mode of said recording and/or reproducing apparatus and for alternately passing said fourth and fifth pulse signals responsive to said switching signal during said still reproduction mode; and output circuit means supplied with an output pulse signal of said switching means for producing the pseudo vertical synchronizing signal from the output pulse signal of said switching means and for outputting the pseudo vertical synchronizing signal.

10. A pseudo vertical synchronizing signal producing circuit as claimed in claim 9 in which said output circuit means comprises an output terminal supplied with the output pulse signal of said switching means for producing the output pulse signal of said switching means as said pseudo vertical synchronizing signal.

11. A pseudo vertical synchronizing signal producing circuit as claimed in claim 10 in which said signal producing means comprises delay means for delaying said third pulse signal and pulse generating means for generating said fifth pulse signal from an output signal of said delay means.

12. A pseudo vertical synchronizing signal producing circuit as claimed in claim 9 in which said output circuit means comprises pulse generating means supplied with the output signal of said switching means for generating the pseudo vertical synchronizing signal from the output signal of said swiching means and an output terminal supplied with the output pseudo vertical synchronizing signal of said pulse generating means.

13. A pseudo vertical synchronizing signal producing circuit as claimed in claim 12 in which said signal producing means comprises delay means for delaying said third pulse signal and edge detecting means for generating said fifth pulse signal by detecting edges of an output signal of said delay means.

14. A pseudo vertical synchronizing signal producing circuit as claimed in claim 9 in which said predetermined oscillation frequency is 60 Hz.

* * * * *